United States Patent [19]
Sukup

[11] Patent Number: 6,012,985
[45] Date of Patent: Jan. 11, 2000

[54] METHOD AND MEANS FOR COUPLING SHAFTS

[75] Inventor: Eugene G. Sukup, Hampton, Iowa

[73] Assignee: Sukup Manufacturing Company, Sheffield, Iowa

[21] Appl. No.: 08/968,275

[22] Filed: Nov. 12, 1997

Related U.S. Application Data

[63] Continuation of application No. 08/584,411, Jan. 11, 1996, abandoned.

[51] Int. Cl.$^7$ .................................................. F16D 7/04
[52] U.S. Cl. ............................... 464/37; 464/83; 464/152
[58] Field of Search ........................ 464/34, 37, 76, 464/74, 83, 152

[56] References Cited

U.S. PATENT DOCUMENTS

| | | |
|---|---|---|
| 898,332 | 9/1908 | Davis . |
| 2,099,848 | 11/1937 | Grodhaus ................................ 464/152 |
| 3,084,774 | 4/1963 | Liang ...................................... 192/44 |
| 3,279,571 | 10/1966 | Wassilieff ................................ 192/38 |
| 3,406,797 | 10/1968 | Toussaint ................................ 192/27 |
| 3,476,226 | 11/1969 | Massey ................................... 192/27 |
| 3,729,953 | 5/1973 | Wanzer .................................. 464/152 |
| 3,732,706 | 5/1973 | Evans ................................... 464/152 X |
| 3,921,771 | 11/1975 | Szabo ................................... 464/37 X |
| 4,204,589 | 5/1980 | Loker et al. ........................... 192/27 |
| 4,386,689 | 6/1983 | Kato ..................................... 464/37 X |
| 5,090,532 | 2/1992 | Bich ..................................... 464/37 |

FOREIGN PATENT DOCUMENTS

| | | | |
|---|---|---|---|
| 1045005 | 11/1953 | France | ..................................... 464/83 |
| 1216622 | 5/1966 | Germany | ................................ 464/37 |
| 1216662 | 5/1966 | Germany | ................................ 464/37 |
| 69322 | 5/1980 | Japan | ..................................... 464/152 |
| 404140516 | 5/1992 | Japan | ..................................... 464/37 |

OTHER PUBLICATIONS

"Sorting Out Flexible Couplings" by Marck McCullough *Machine Design* Sep. 28, 1995 issue.

*Primary Examiner*—Donald P. Walsh
*Assistant Examiner*—Emmanuel M. Marcelo
*Attorney, Agent, or Firm*—Zarley, McKee, Thomte, Voorhees & Sease

[57] ABSTRACT

A coupler for coupling shafts has an inside coupling having an outer periphery and a center opening with a longitudinal axis which is adapted to receive the end of a driving shaft. An outside coupling has a center opening with an inner periphery, and is rotatably fitted over the outer periphery of the inside coupling. A plurality of arcuate notches are located in the outer periphery of the inner coupling and the inner periphery of the outer coupling and are adapted to register with each other in mating relationship wherein the mating notches present collectively a circular roller surface. A plurality of cylindrical rollers are rotatably mounted in the notches of the inside and outside coupling and serve to operatively join the inside and outside coupling for rotation together. The notches in the inside coupling have an arcuate portion capable of receiving the rollers in a nesting position without the rollers penetrating the notches in the outside coupling. Further, the shape of the notches in the inside coupling are also of a shape that if the inside and outside couplings are rotating in one direction in operative engagement to the rollers, and the inside coupling has its rotational motion retarded, the rollers will return to the nesting position within the notches of the inside roller to disengage the operative engagement between the couplings.

9 Claims, 9 Drawing Sheets

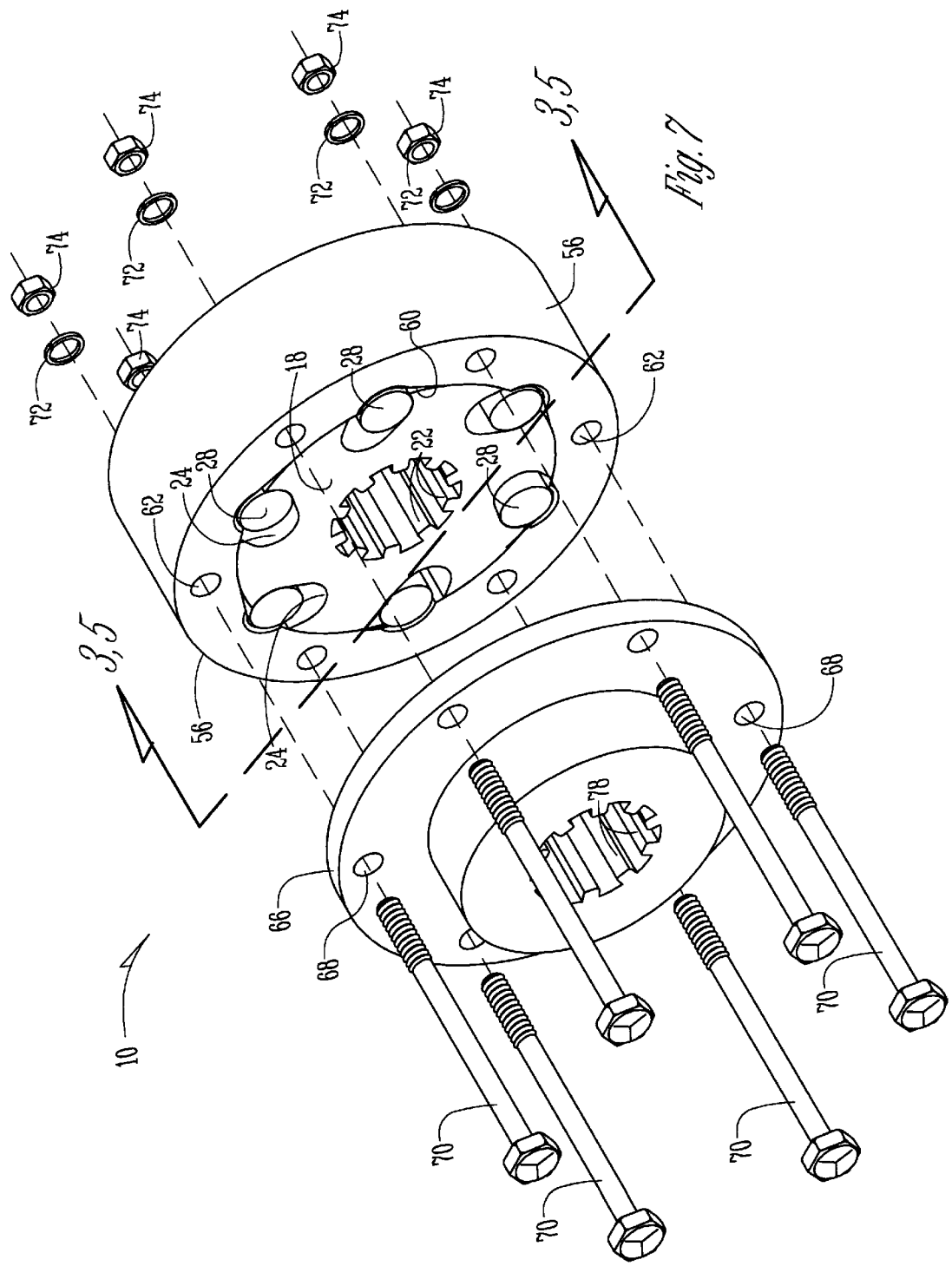

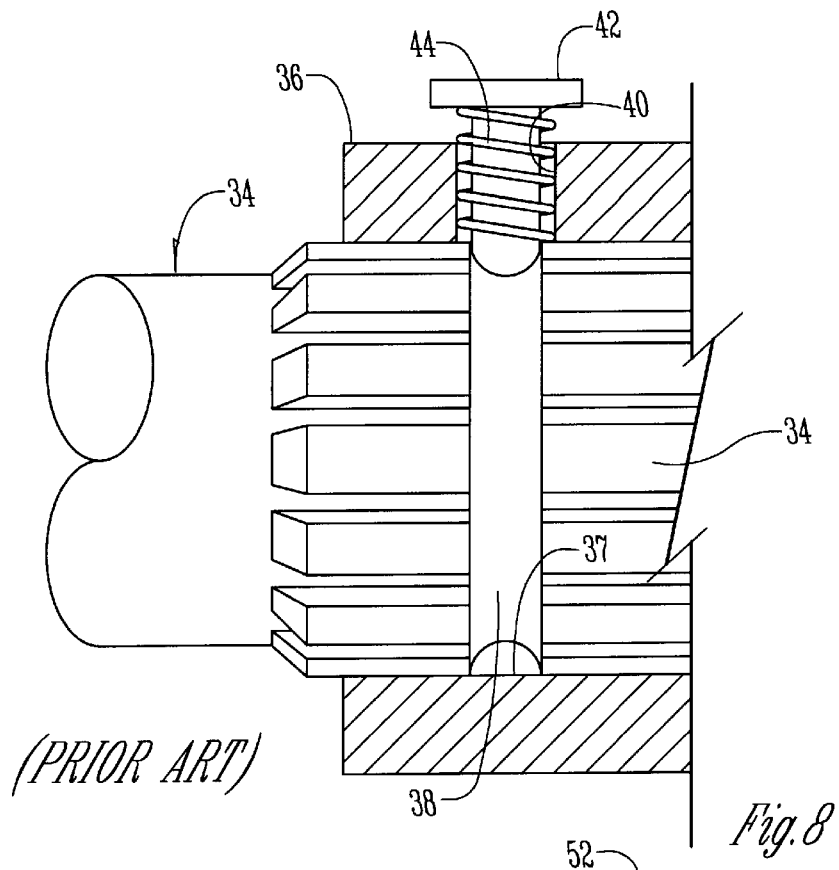
(PRIOR ART) Fig. 8
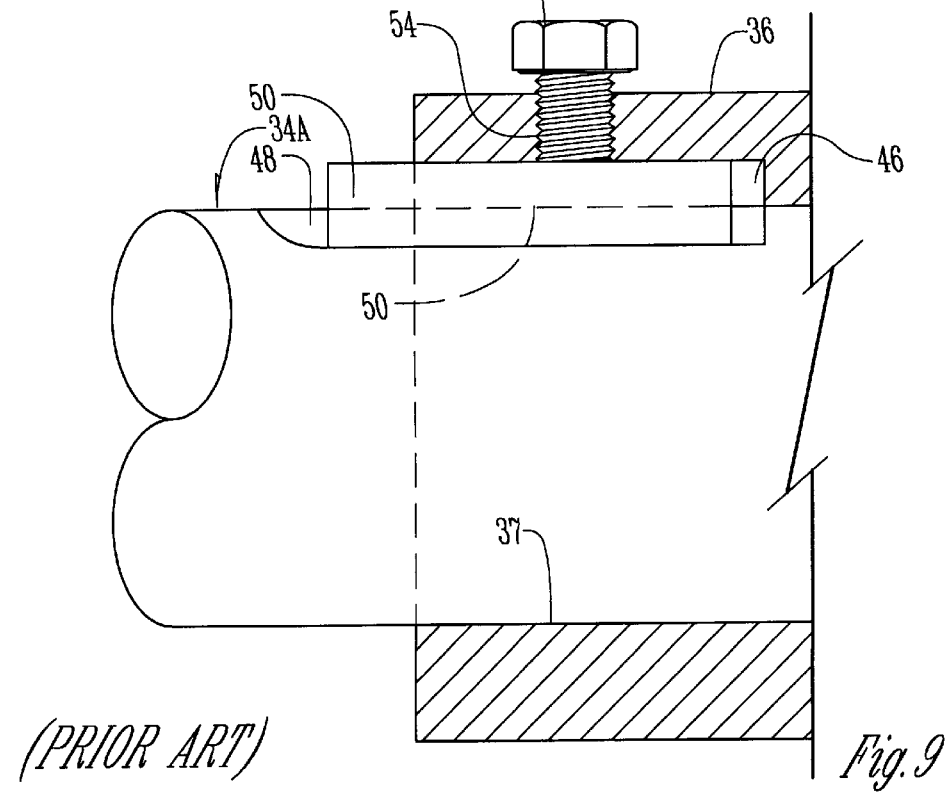
(PRIOR ART) Fig. 9

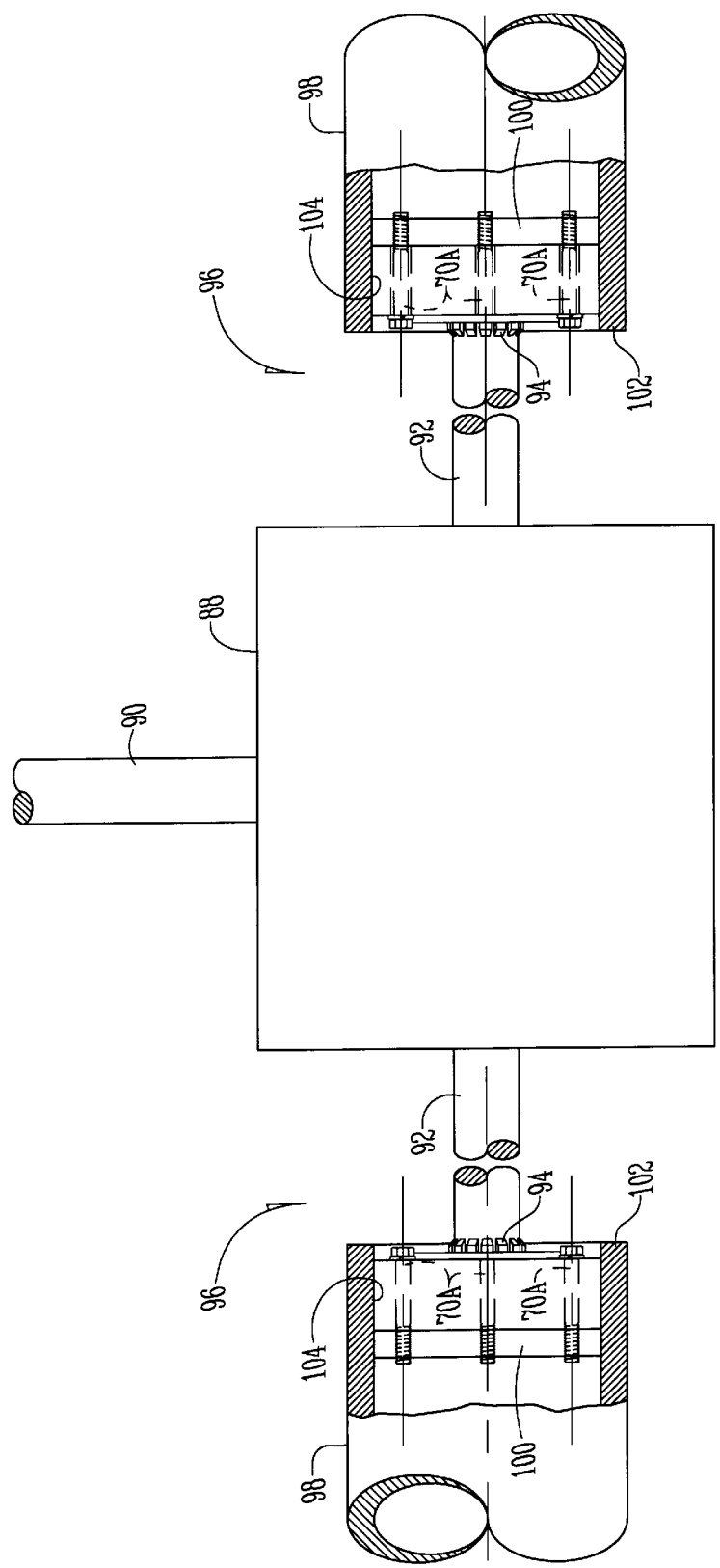

6,012,985

METHOD AND MEANS FOR COUPLING SHAFTS

This is a continuation of application Ser. No. 08/584,411 filed on Jan. 11, 1996, now abandoned.

BACKGROUND OF THE INVENTION

There are many devices for coupling shafts which will accommodate conditions of misalignment and the like. However, existing devices are often difficult to place in operative condition because the splines or the key way shafts of the opposing shafts are in a condition of radial and angular misalignment when the coupling process is undertaken. Other devices are extremely difficult to operate and are subject to having their operative components clogged with dirt and debris.

In addition, certain applications and environments of power shafts call for them to be subject to immediate stoppage or braking because of safety requirements. If the coupling rigidly secures the two shafts together, the sudden stoppage of the drive shaft can cause severe damage to the power gear train serviced by the driven shaft.

It is therefore a principal object of this invention to provide a method and means for coupling shafts which can be easily installed and which can easily overcome any radial misalignment of splines or key way slots on the shafts being coupled.

A further object of this invention is to have an overriding clutch mechanism as a part of the coupler for the shafts which will permit the driving shaft to have its rotation either reduced or slowed without causing the driven shaft to also be slowed or stopped to the damage of its drive train components.

A still further object of this invention is to provide a method and means for coupling shafts that is safe, and which can handle great torque loads, and to provide a coupler for such shafts which is free from the inhibiting affects of dirt and the like in the environment in which it is used.

These and other objects will be apparent to those skilled in the art.

SUMMARY OF THE INVENTION

A coupler for coupling shafts has an inside coupling having an outer periphery and a center opening with a longitudinal axis which is adapted to receive the end of a driving shaft. An outside coupling has a center opening with an inner periphery, and is rotatably fitted over the outer periphery of the inside coupling. A plurality of arcuate notches are located in the outer periphery of the inner coupling and the inner periphery of the outer coupling and are adapted to register with each other in mating relationship wherein the mating notches present collectively a circular roller surface.

A plurality of cylindrical rollers are rotatably mounted in the notches of the inside and outside coupling and serve to operatively join the inside and outside coupling for rotation together. The notches in the inside coupling have an arcuate portion capable of receiving the rollers in a nesting position without the rollers penetrating the notches in the outside coupling. The notches in the inside coupling are of a shape that rollers therein may move by centrifugal force into operative engagement with the notches in the outside coupling. Further, the shape of the notches in the inside coupling are also of a shape that if the inside and outside couplings are rotating in one direction in operative engagement to the rollers, and the inside coupling has its rotational motion retarded, the rollers will return to the nesting position within the notches of the inside roller to disengage the operative engagement between the couplings.

Spring elements can be used in the notches of the inside coupling to normally urge the rollers into operative engagement with the notches in the outside coupling.

The method of coupling two shafts with the structure described heretofore involves rotating the inside coupling with respect to the outside coupling to permit the hub attached to the outside coupling to have its splines or key way slots aligned with those of the shaft to be driven, or conversely, to have the splines or key way shafts of the inside coupling aligned with those of the driving shaft.

BRIEF DESCRIPTION OF THE DRAWINGS

FIG. 7 is an exploded perspective view showing the unassembled components of FIGS. 1 and 2;

FIG. 8 is a sectional view through a prior art arrangement for securing a spline shaft within a socket;

FIG. 9 is a prior art sectional view showing a smooth shaft secured within the bore of a socket by means of registering key way slots in the shaft and the inner bore of the socket;

FIG. 12 is a schematic view of the application of the form of the invention shown in FIGS. 10 and 11.

DESCRIPTION OF THE PREFERRED EMBODIMENT

Figure 1:
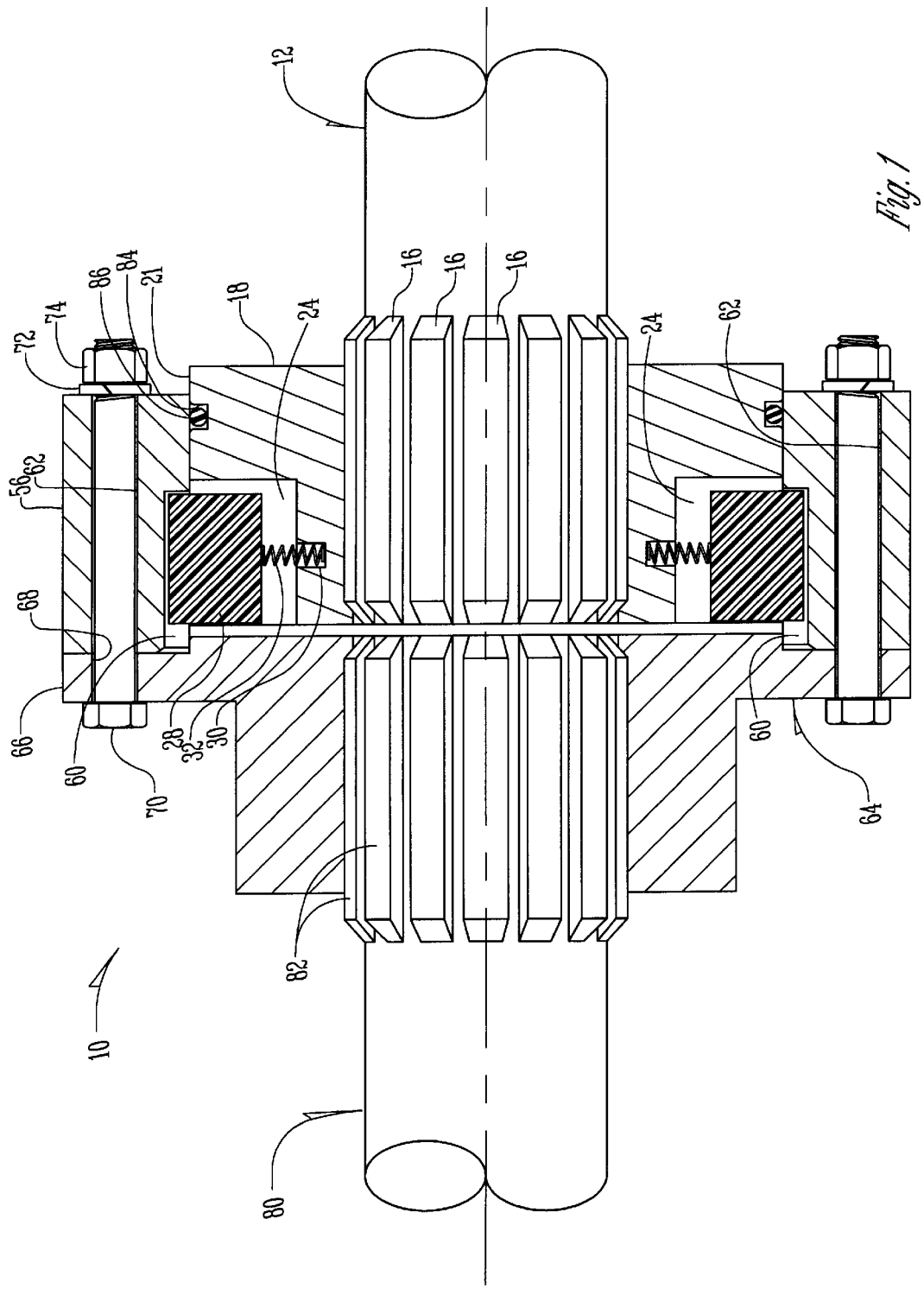
FIG. 1 is a longitudinal sectional view through the preferred embodiment of this invention showing a driving shaft coupled to a driven shaft and also showing the overriding clutch mechanism of the invention.
Figure 2:
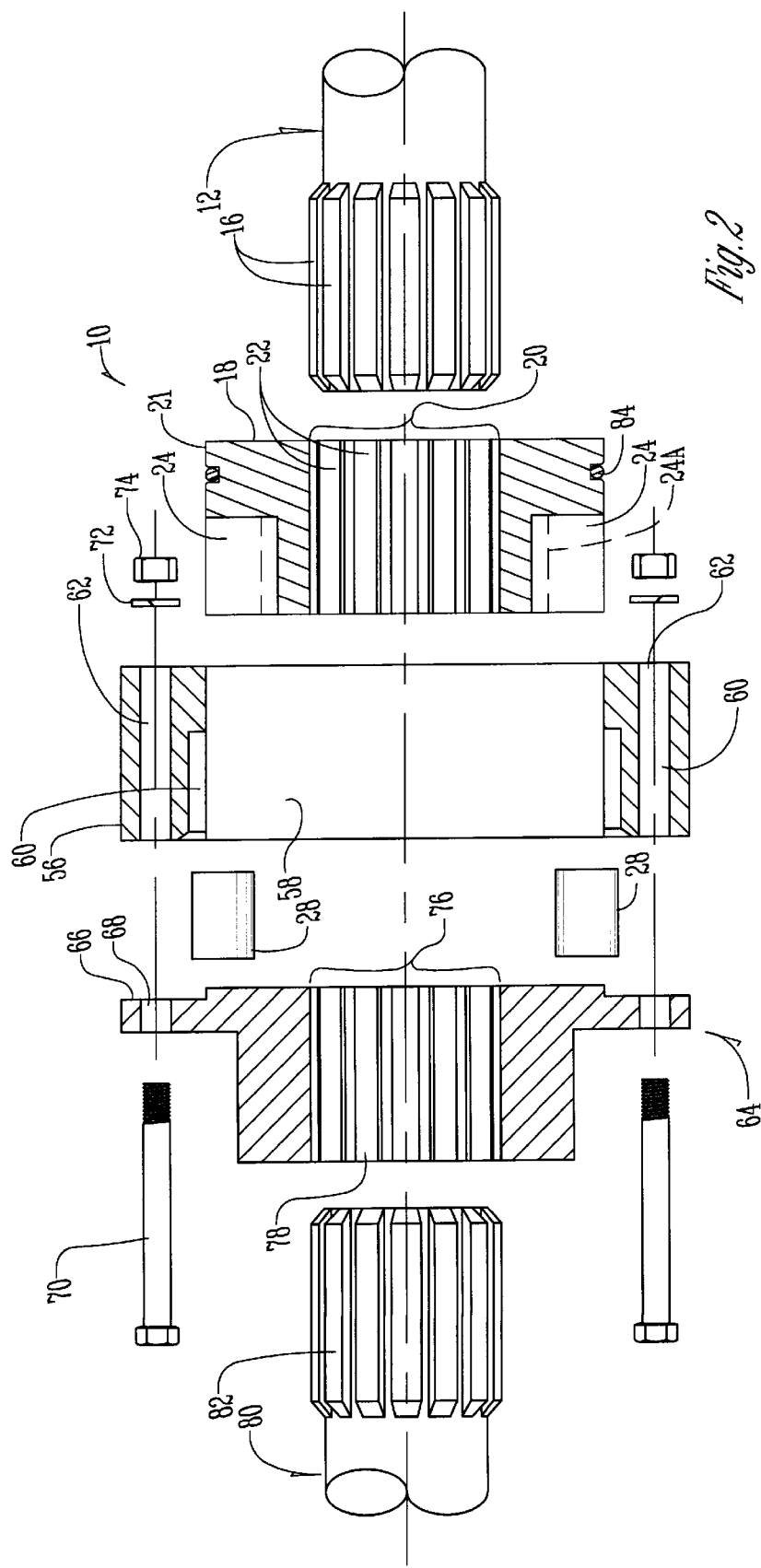
FIG. 2 is an exploded view at a reduced scale of the components of FIG. 1.

The numeral 10 designates the coupler of FIGS. 1, 2 and 5 through 7. The numeral 10A designates the coupler of a modified form of the invention shown in part in FIGS. 3 and 4. The numeral 12 designates a driving shaft such as that which might be connected to the power take off shaft of a tractor, and the numeral 80 designates a driven shaft such as the shaft of stalk cutter or the like. Each of the shafts 12 and 80 have conventional splines 16 and 82.

An inside coupling 18 (FIGS. 1, 2 and 7) has a center opening 20 which is also splined at 22 to receive the spline 16 of driving shaft 12. Inside coupling 18 has an outer perimeter surface 21 which has a plurality of oblong-shaped arcuate notches 24. The alternate form of the invention shown in FIGS. 3 and 4 has semi-circular notches 24A. The notches 24 have an arcuate portion 26 which can fully receive the cylindrical rollers 28 in a retracted nesting position (FIG. 6). The rollers are preferably comprised of a hardened plastic material. Each notch 24 has a well 30 at the "bottom" thereof which has spring 32 mounted therein and projecting out of the well into the arcuate portion 26. Springs 32 bear against the rollers 28 and normally tend to move the rollers to the operative position shown in FIGS. 1, 5 and 7.

Conventional means can be employed in this invention to connect one or both of the shafts to be coupled within the sockets or center openings of the coupling members. One prior art system for retaining a shaft within a socket is shown in FIG. 8. A spline shaft 34 is inserted into the socket 36 having a center bore 37. An annular groove 38 is cut in shaft 34. Socket 36 has an aperture 40 therein in which a pin 42 is slidably mounted and is normally urged by spring 44 in an inwardly direction. The inward end of pin 42 extends into the annular groove 38 to prevent any longitudinal movement of the shaft 34 with respect to the center bore 37 of socket 36. By lifting pin 42 to remove its inner end from annular groove 38, the shaft 34 can be slidably removed from the socket 36.

Similarly, FIG. 9 shows a shaft 34A mounted within socket 36. Socket 36 has a key way slot 46 cut therein which is adapted to register with key way slot 48 in the smooth shaft 34A. A conventional key 50 is inserted within the registering key way slots 46 and 48. The key 50 is maintained in position within the key way slots by lock screw 52 which is threadably inserted into bore 54 to engage the key 50 and maintain its operative position.

Figure 3:
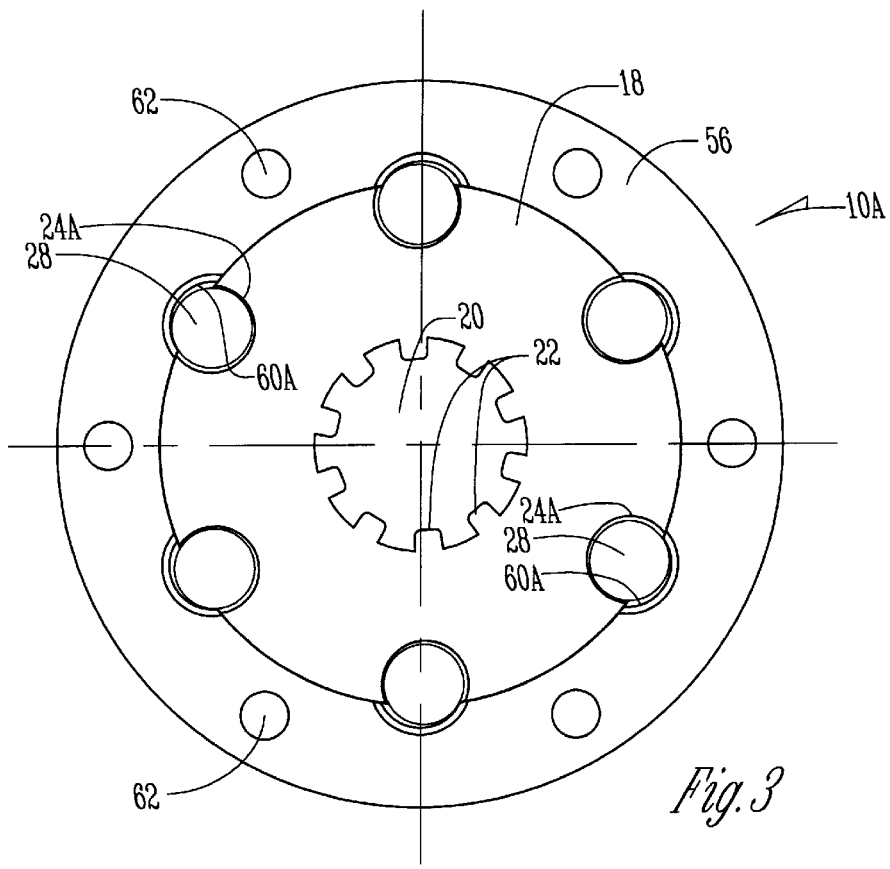
FIG. 3 is an elevational view of the assembled inner and outer coupling members as seen on line 3—3 of FIG. 7, but shows a modified form of the invention.
Figure 4:
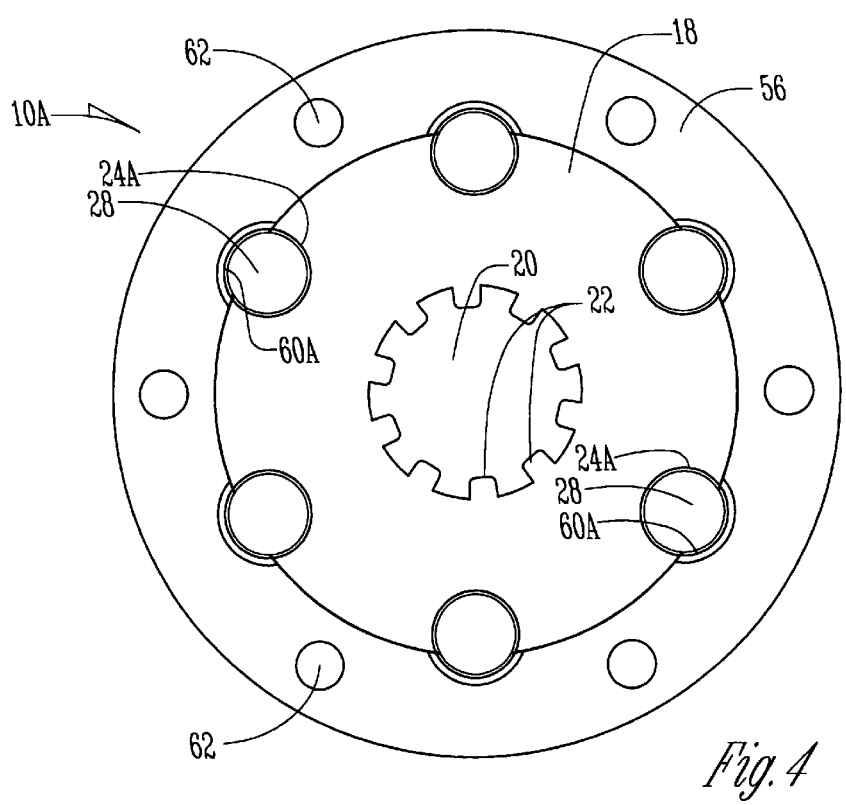
FIG. 4 is an elevational view similar to that of FIG. 3 but shows the components in a static condition rather than the operative condition in FIG. 3.
Figure 5:
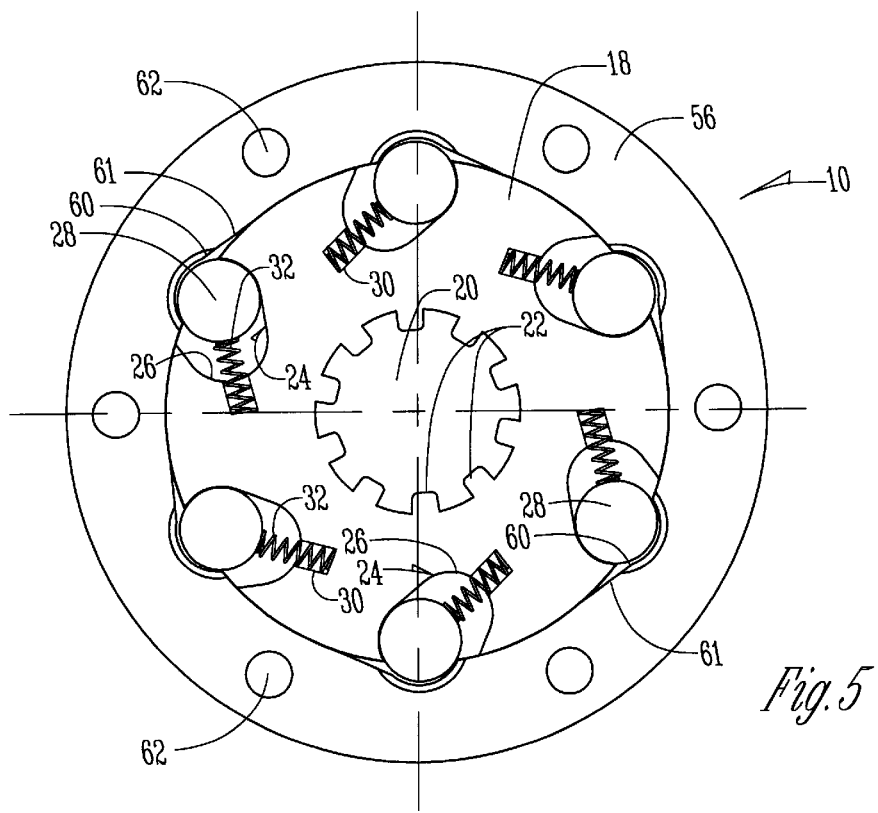
FIG. 5 is a view similar to that of FIG. 3 but shows the precise components of FIG. 7 in their operative condition.
Figure 6:
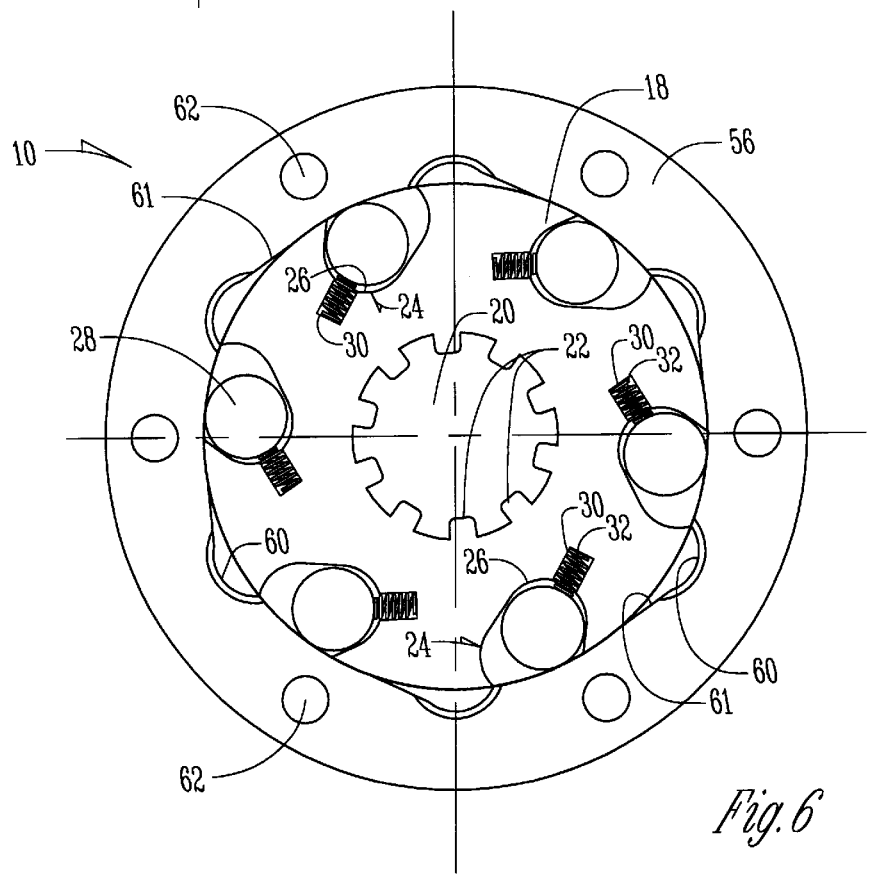
FIG. 6 is a view similar to that of FIG. 5 but shows the components in their inoperative or overriding position.

Outside coupling 56 (FIGS. 1, 2, and 5 through 7) has a center opening 58 with semi-circular notches 60 which are adapted to register with the notches 24 of FIG. 5 or the notches 24A of FIG. 3). Notches 60 have a tapered portion 61 to facilitate the entry of rollers 28. Coupling 56 in the coupler 10A of FIGS. 3 and 4 have only semi-circular notches 60A. Longitudinal apertures 62 are located in the outer portion of coupling 56. (The depth of notches 24A are shown in dotted lines in FIG. 2 to show their relative depth to notches 24.) There is a slight cylindrical space between the outer perimeter surface 21 of inner coupling 18 and the inner diameter of center opening 58 to permit, if required for alignment purposes, the inner coupling to be slightly skewed within the opening 58.

A hub 64 (FIG. 1) having an outwardly extending flange 66 has a plurality of apertures 68 which are adapted to register with the aperture 62 in outside coupling 56. Bolts 70 are adapted to extend through the registered apertures 62 and 68 and hold the outside coupling 56 to the hub 64 through the conventional function of lock washers 72 and nuts 74.

The hub 64 has a center opening 76 with splines 78 to mate and receive the splines 82 of driven shaft 80.

Again, the hub 64, or the inside coupling 18 can utilize either of the conventional attachment devices of FIGS. 8 and 9 if desired. The hub 64 for this invention is more likely to require the structure of FIG. 8 or 9. The couplers of this invention can be mounted on the ends of opposing shafts in more than one manner. For example, the hub 64 can be mounted on the end of shaft 80; the inside coupling 18 can be assembled within the interior of outside coupling 56 and brought together generally as shown in FIG. 1. If the apertures 62 and the outside coupling do not register with the apertures 68 in hub 64, the outside coupling can be rotated on the inside coupling to create this alignment whereupon bolt 70 can be used with nuts 74 to secure the hub and the outside coupling together. This alignment will occur in the coupler 10 of FIGS. 1, 2 and 5 through 7 when the outside coupling is rotated with respect to the then stationary inside coupling. The manual rotation can take place when the rollers 28 are moved from their operating position in FIG. 5 to the withdrawn nesting position of FIG. 6.

The device of FIGS. 3 and 4 requires that the shaft 80 be rotated to achieve this alignment of apertures.

More typically, the assembled coupler 10 of FIG. 1 is mounted on the shaft 12, and the driven shaft 80 is then moved longitudinally into the center opening 76 of hub 64. If the splines 78 of the hub are not in alignment with the splines 82 on shaft 80, the outer coupling 56 is rotated with respect to the then stationary inner coupling 18 to achieve the alignment of the splines 78 and the splines 82.

Seal ring 86 in annular groove 84 in inner coupling 18 (FIG. 1) helps keep dirt out of the inner face between couplings 18 and 56, and out of contact with rollers 28.

It should be understood that the shaft 80, and/or the shaft 12 can be conventionally telescopically length adjustable so as to facilitate the entrance of the shaft ends within either the hub 64 or the inside coupling 18.

In operation, if the inside coupling 18 of coupler 10 is in the configuration of FIG. 6 when the rotational power is applied to shaft 12, the inside coupling 18 will be rotated until the notches 24 and 60 become aligned wherein the springs 32 will urge the rollers 28 into the operating position shown in FIG. 5. In that position, the rollers occupy portions of the notches 60 in the outside coupling 56 and the notches 24 in the inside coupling 18. The device will operate without the springs 32 if desired for the centrifugal force of the rotating inside coupling 18 will cause the rollers to move into the operating position of FIG. 5. In the embodiment of FIGS. 3 and 4, the rollers 28 are always in the operating position required in that they occupy the space within the notches 24A in the inside coupling and the semi-circular notches 60A in the outside coupling. FIG. 4 shows the rollers in their static condition and FIG. 3 shows the rollers in their operating condition as they have slightly moved to forcibly impose rotational power through their engagement with one side of the notches 60A which are located in the outside coupling.

If braking power is applied to the driving shaft 12, the effective rotational speed of inside coupling 18 is thereupon either decreased or stopped. The device of FIGS. 1, 2 and 5–7 causes the outside coupling, which is still wanting to rotate at the designated operational speed, to force the rollers 28 back into the notches 24 as shown in FIG. 6. In such instance, the springs 32 are in the compressed position shown in FIG. 6. While in this configuration, the outside coupling 56 can continue to operate at its disconnected speed (induced by the inertial force of shaft 80 and the members that shaft 80 is driving). Thus, shaft 80, hub 64, and outside coupling 56 will continue to rotate without imposing any undesired forces on the gear train of the implement being driven. That rotation will obviously stop as friction overtakes the rotating implement that shaft 80 is driving.

The shaft 12 and the couplers 10 and 10A can be disconnected from the shaft 80 by releasing whatever coupling means (FIGS. 8 and 9) that may be securing shaft 80 within hub 64. The shaft 80 is thereupon longitudinally removed from the hub, whereupon the shafts 80 and 12 are effectively disconnected. Similarly, the couplers 10 and 10A can be left mounted on shaft 80 and disconnected by means of withdrawing shaft 12 from inside coupling 18.

DESCRIPTION OF MODIFIED FORM OF THE INVENTION

Figure 10:
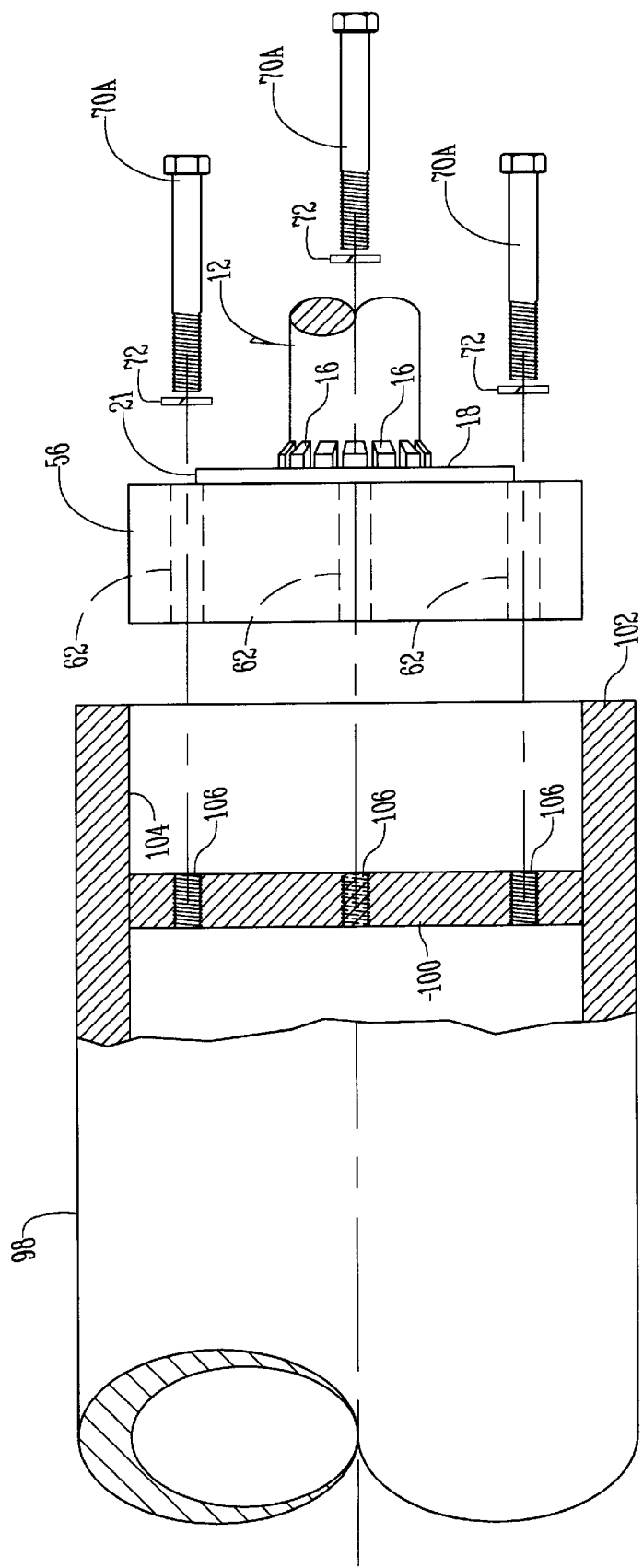
FIG. 10 is an exploded partial sectional view of a modified form of the invention.
Figure 11:
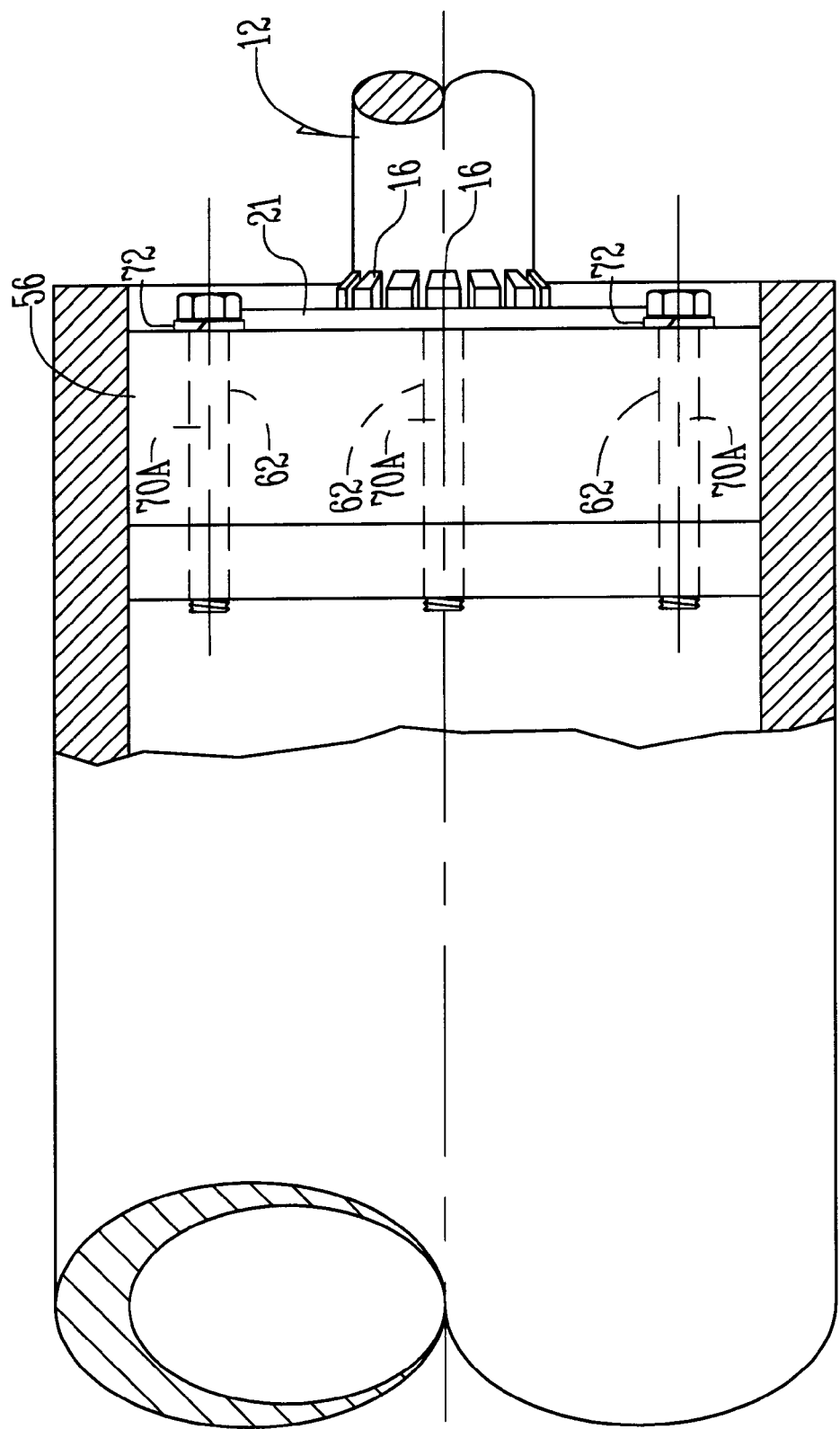
FIG. 11 is a view similar to that of FIG. 10 but in an assembled condition.

FIGS. 10–12 show a modified form of the invention. A conventional gear box 88 is powered by input shaft 90 which in turn is powered by a prime mover (not shown) such as a tractor. Laterally extending opposite output shafts 92 having conventional spherical ends 94 which extend from the sides of gear box 88. The structure of FIG. 12 shows an environment where a tractor or the like is pulling and providing operational power to a stalk shredder 96 or similar farm implement which utilizes gear box 88 and a pair of elongated hollow laterally extending shafts 98 with shredder blades (not shown) swingably mounted thereon. As the shafts 98 are caused to rotate, the blades thereon impact the stalks, hay or the like, and shred them into fine particles. The coupling of this invention is very useful in this environment.

Again with reference to FIGS. 10, 11 and 12, the portion of the device shown in FIG. 1 relating to the inside coupling 18, the outside coupling 56, and the other components of FIG. 1 directly relating thereto, are used in the embodiment of these three drawings. The hub 64 of FIG. 1 has been replaced by a circular plate 100 which is welded within the inner ends 102 of the center bore 104 of shafts 98. The plates 100 have a plurality of threaded apertures 106 (FIG. 10) which threadably receive bolts 70A which lock the outer coupling 56 to plates 100. Thus, in the embodiment of FIGS. 10, 11 and 12, plates 100 serve in place of the hub 64 in FIG. 1. Other than that, the coupling 56 and related components function just as the coupling shown in FIGS. 1, 5 and 6. The couplings on opposite shafts 98 should be built in righthand and lefthand versions so that the shafts will rotate in the same direction and will be able to function identically on opposite sides of the gear box 88.

From the foregoing, it is seen that the device and method of this invention will achieve at least all of their stated objectives.

What is claimed is:

1. A coupler for operatively connecting shafts, comprising,
   a circular inside coupling having an outer periphery, and a center opening with a longitudinal axis adapted to receive the end of a driving shaft,
   an outside coupling having a center opening with an inner periphery, and being rotatably fitted over the outer periphery of said inside coupling,
   a plurality of arcuate notches in the outer periphery of said inner coupling and the inner periphery of said outer coupling and being adapted to register with each other in mating relationship wherein mating notches present collectively a circular roller surface,
   a plurality of cylindrical rollers rotatably mounted in said circular roller surface to operatively join said inside and said outside coupling for rotation together, and
   a hub rigidly and detachably connected to said outside coupling, said hub having a center opening for directly receiving and engaging a shaft to be driven.

2. The coupler of claim 1 wherein the notches in said inside coupling have an arcuate portion capable of receiving said rollers in a nesting position without said rollers penetrating the notches in said outside coupling.

3. The coupler of claim 2 wherein the notches in said inside coupling are of a shape that rollers therein may move by centrifugal force into operative engagement with the notches in said outside coupling upon rotation of said inside coupling with respect to said outside coupling.

4. The coupler of claim 3 wherein the shape of the notches in said inside coupling are also of a shape that if said inside and said outside couplings are rotating in one direction in operative engagement through said rollers, and said inside coupling has its rotational motion retarded, said rollers will return to said nesting position within the notches of said inside coupling to disengage the operative engagement between said couplings.

5. The coupler of claim 2 wherein the notches in said inside coupling include resilient elements normally urging said rollers into operative engagement with the notches in said outside coupling.

6. The coupler of claim 1 wherein said notches in said couplings are substantially semi-circular in shape.

7. The coupler of claim 1 further comprising connectors connecting together said hub and said outside coupling.

8. The coupler of claim 7 wherein said connectors extend through registering apertures in said hub and said outside coupling.

9. A method of coupling the ends of a pair of spaced aligned shafts with a coupler wherein the coupler is comprised of an inside coupling having an outer periphery, and a center opening with a longitudinal axis adapted to receive the end of a driving shaft, an outside coupling having a center opening with an inner periphery, and being rotatably fitted over the outer periphery of said inside coupling, a plurality of arcuate notches in the outer periphery of said inner coupling and the inner periphery of said outer coupling and being adapted to register with each other in mating relationship wherein mating notches present collectively a circular roller surface, a plurality of cylindrical rollers rotatably mounted in said circular roller surface to operatively join said inside and said outside coupling for rotation together, said outside coupling having alignable connectors for detachable connection to alignable connecting means on a hub having a center opening to receive a driven shaft,
   placing an end of a drive shaft in the center opening of said inside coupling,
   rotating said outside coupling until the alignable connectors of said outside coupling longitudinally align with the connecting means on said hub,
   and rigidly connecting said hub to said outside coupling and placing said driven shaft within the center opening of said hub.

\* \* \* \* \*